United States Patent
Bezemer et al.

(10) Patent No.: US 10,227,533 B2
(45) Date of Patent: Mar. 12, 2019

(54) PROCESS TO PREPARE PARAFFINS AND WAXES

(71) Applicant: SHELL OIL COMPANY, Houston, TX (US)

(72) Inventors: Gerrit Leendert Bezemer, Amsterdam (NL); Harold Boerrigter, Amsterdam (NL); Hai Ming Tan, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/756,202

(22) PCT Filed: Sep. 1, 2016

(86) PCT No.: PCT/EP2016/070616
§ 371 (c)(1),
(2) Date: Feb. 28, 2018

(87) PCT Pub. No.: WO2017/037176
PCT Pub. Date: Mar. 9, 2017

(65) Prior Publication Data
US 2018/0251683 A1    Sep. 6, 2018

(30) Foreign Application Priority Data
Sep. 4, 2015  (EP) ..................... 15183837

(51) Int. Cl.
*C10G 2/00*    (2006.01)
*C10G 45/00*   (2006.01)
(Continued)

(52) U.S. Cl.
CPC ............... *C10G 2/33* (2013.01); *B01D 3/143* (2013.01); *C10G 2/331* (2013.01); *C10G 2/341* (2013.01);
(Continued)

(58) Field of Classification Search
None
See application file for complete search history.

(56) References Cited

U.S. PATENT DOCUMENTS 2,692,835 A   10/1954  Capell et al.
4,595,703 A   6/1986   Payne et al.
(Continued)

FOREIGN PATENT DOCUMENTS

EP   1498469 A2   1/2005
EP   2655565 A2   10/2013
(Continued)

OTHER PUBLICATIONS

Scherzer et al., "Reactions and Reaction Pathways", Hydrocracking Science and Technology, Chapter 6, 1996, ISBN 0-8247-9760-4.
(Continued)

*Primary Examiner* — Medhanit W Bahta

(57) ABSTRACT

Paraffins and waxes are produced from a gaseous feed stream comprising hydrogen and carbon monoxide in a Fischer-Tropsch reactor using a fixed bed of reduced Fischer-Tropsch catalyst having cobalt as catalytically active metal. A nitrogen-containing compound is added to the gaseous feed stream in a concentration of up to 10 ppmV and the mixture if fed to the reactor to obtain paraffins having from 5 to 300 carbon atoms. The product is subjected to a hydrogenation step, to obtain a hydrogenated fraction comprising 5 to 300 carbon atoms. The hydrogenated product is separated into C5-C9, C10-C17, and C18-300 fractions. The C18-C300 fraction is separated to obtain one or more first light waxes having a congealing point in the range of 30 to 75° C. and a second heavy wax having a congealing point in the range of 75 to 120° C.

20 Claims, 1 Drawing Sheet

(51) Int. Cl.
*C10G 65/04* (2006.01)
*C10G 73/44* (2006.01)
*C10G 45/02* (2006.01)
*B01D 3/14* (2006.01)

(52) U.S. Cl.
CPC ............ *C10G 45/00* (2013.01); *C10G 45/02* (2013.01); *C10G 65/04* (2013.01); *C10G 73/44* (2013.01); *B01D 2256/24* (2013.01); *B01D 2257/7022* (2013.01); *C10G 2300/1022* (2013.01); *C10G 2300/1085* (2013.01)

(56) References Cited

U.S. PATENT DOCUMENTS

| | | | |
|---|---|---|---|
| 5,904,834 A | 5/1999 | Ansorge et al. | |
| 6,855,248 B1* | 2/2005 | Olivier | C10G 7/00 203/DIG. 25 |
| 2005/0154069 A1* | 7/2005 | Inga | C10G 2/332 518/726 |
| 2005/0247601 A1 | 11/2005 | Hoek | |
| 2009/0018374 A1* | 1/2009 | Bijlsma | B01J 21/04 568/959 |
| 2011/0160510 A1 | 6/2011 | Claeys et al. | |

FOREIGN PATENT DOCUMENTS

| | | |
|---|---|---|
| WO | 9700231 A1 | 1/1997 |
| WO | 02102941 A2 | 12/2002 |
| WO | 03070857 A1 | 8/2003 |
| WO | 2004009739 A2 | 1/2004 |
| WO | 2007082589 A1 | 7/2007 |
| WO | 2013064539 A1 | 5/2013 |
| WO | 2014095814 A1 | 6/2014 |

OTHER PUBLICATIONS

Gorak et al., "Short Path Distillation", Distillation: Operations and Applications, Elsevier Inc, 1st Edition, Chapter 9.1, Oxford, 2014, pp. 367-401.
Iglesia, "Design, synthesis, and use of cobalt-based Fischer-Tropsch synthesis catalysts", Applied Catalysis A: General, vol. 161, Issue No. 1-2, Nov. 4, 1997, pp. 59-78.
Ngwenya et al., "Fischer-Tropsch Results and Their Analysis for Reactor Synthesis", Ind. Eng. Chem. Res., vol. 44, Issue No. 16, Apr. 9, 2005, pp. 5987-5994, XP055254403.
Storch et al., "The Fischer-Tropsch and related synthesis", John Wiley & Sons, Inc., New York, 1951, pp. 217, 330 and 370-372.
International Search Report and Written Opinion received for PCT Patent Application No. PCT/EP2016/070616, dated Nov. 4, 2016, 12 pages.

* cited by examiner

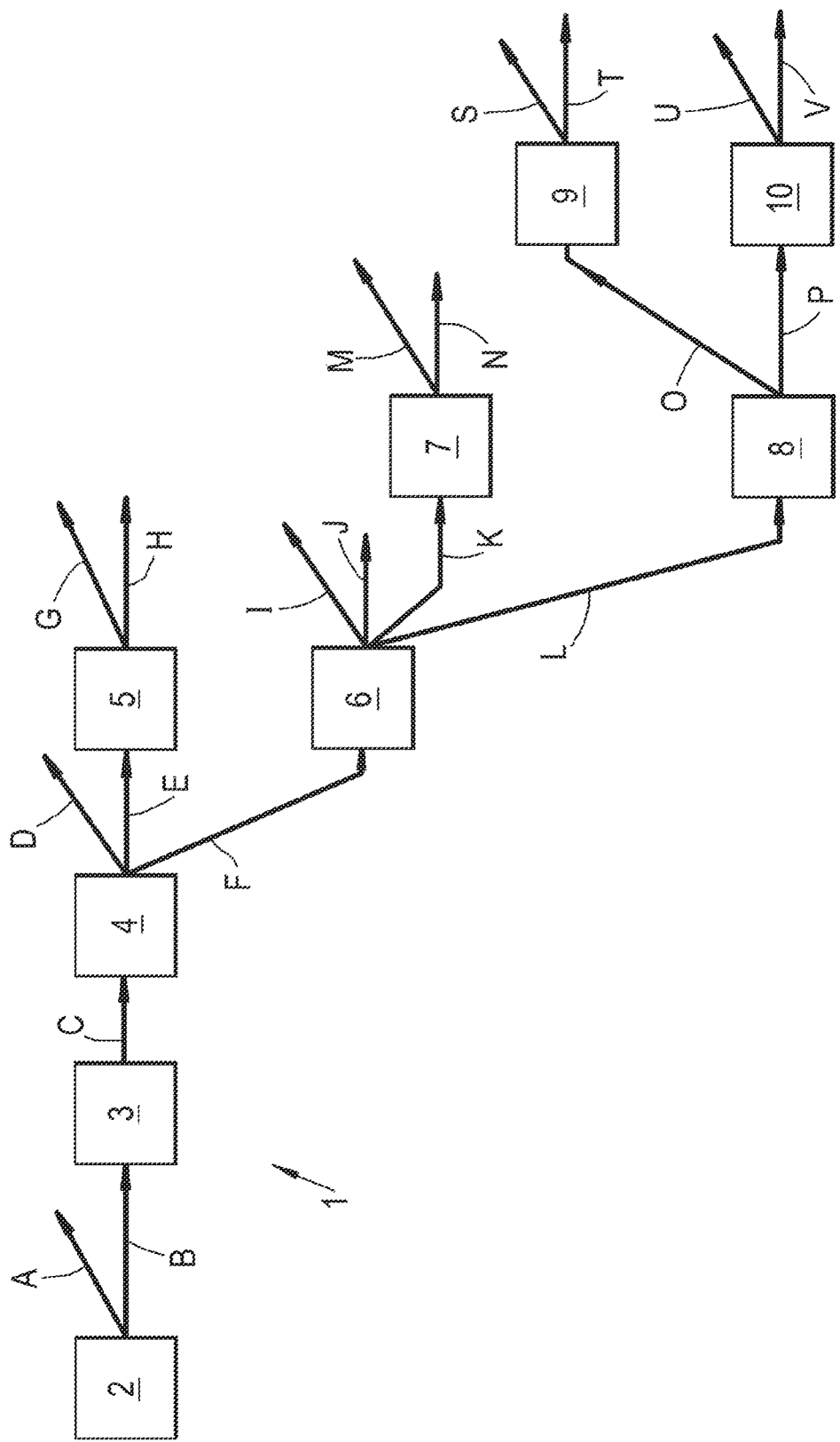

PROCESS TO PREPARE PARAFFINS AND WAXES

PRIORITY CLAIM

The present application is the National Stage (§ 371) of International Application No. PCT/EP2016/070616, filed 1 Sep. 2016, which claims priority from European Application No. 15183837.2, filed 4 Sep. 2015 incorporated herein by reference.

FIELD OF THE INVENTION

The present invention relates to a process to prepare paraffins and waxes by operating a Fischer-Tropsch reactor comprising a fixed bed of reduced Fischer-Tropsch catalyst that comprises cobalt as catalytically active metal. Further, the present invention relates to paraffins and waxes obtainable by said Fischer-Tropsch reaction.

BACKGROUND OF THE INVENTION

Paraffin wax and paraffins may be obtained by various processes. U.S. Pat. No. 2,692,835 and EP2655565 disclose a method for deriving paraffin wax and paraffins from crude oil. Also, paraffin wax and paraffins may be obtained using the so called Fischer-Tropsch process. An example of such process is disclosed in WO 2002/102941, EP 1 498 469, WO 2004/009739, WO 2013/064539 and in WO2014095814.

The Fischer-Tropsch process can be used for the conversion of synthesis gas into liquid and/or solid hydrocarbons. The synthesis gas may be obtained from hydrocarbonaceous feedstock in a process wherein the feedstock, e.g. natural gas, associated gas and/or coal-bed methane, heavy and/or residual oil fractions, coal, biomass, is converted in a first step into a mixture of hydrogen and carbon monoxide. This mixture is often referred to as synthesis gas or syngas. The synthesis gas is then fed into a reactor where it is converted in one or more steps over a suitable catalyst at elevated temperature and pressure into paraffinic compounds and water in the actual Fischer-Tropsch process. The obtained paraffinic compounds range from methane to high molecular weight molecules. The obtained high molecular weight molecules can comprise up to 200 carbon atoms, or, under particular circumstances, even more carbon atoms. Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebulated bed reactors.

Catalysts used in the Fischer-Tropsch synthesis often comprise a carrier-based support material and one or more metals from Group 8-10 of the Periodic Table of Elements, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

The hydrocarbon product stream obtained after the Fischer-Tropsch synthesis comprises mainly paraffinic compounds ranging from methane to high molecular weight molecules. Of this range of products the lighter part (i.e. methane (C1) to butane (C4)) and the heavier part C40+ are the least desired products of the product stream. For the production of paraffins and waxes the most valued are the hydrocarbons ranging from C5 to C40 (C indicating the carbon chain length). The lighter part of the product stream is normally recovered from the product stream as tail gas and can be reused upstream of the Fischer-Tropsch process (for example in the synthesis gas production).

Typically, the Fischer-Tropsch catalyst deactivate in time, and in order to maintain the productivity, the temperature is increased. Higher operating temperature for an "end of run" (EOR) catalyst results in a lower C5+ selectivity and a lighter wax. On the other side, the freshly started (Start of Run (SOR)) catalyst operation at high C5+ selectivity and a heavy wax. The relation between the operating temperatures of the catalyst and the selectivity is for example described on page 217 of "The Fischer-Tropsch and related synthesis", H. H. Storch; N. Columbic; R. B. Anderson, John Wiley & Sons, Inc., New York, 1951. With the term "lighter wax" is meant that the heavy wax C40+ fraction has less tailing to very long chains. With the term "heavy wax" is meant a C40+ fraction with tailing to long chain number.

There are several ways known to improve the yield of the paraffins and waxes comprising hydrocarbons ranging from C10 to C40 of the product stream obtained from a Fischer-Tropsch reaction. It is possible to change the catalyst formulation and select a catalyst with an improved yield to this desired part of the product stream. The relation between the catalyst formulation and the improved yield of this catalyst due to the formulation change is for examples described in Applied Catalysis A, 161 (1997), page 59-78. Once the catalyst has been selected the distribution is fixed for a large extent. Moreover, even with the same catalyst a relative small change is possible by varying the concentration of CO, $H_2$ and inert in the gaseous stream towards the reactor. The impact of partial pressures and $H_2$/CO on activity and methane selectivity is for example described in Ind. Eng. Chem. Res. 2005, 44, page 5987-5994 and described on page 330, and on 370-372 of "The Fischer-Tropsch and related synthesis", H. H. Storch; N. Columbic; R. B. Anderson, John Wiley & Sons, Inc., New York, 1951. Finally it is possible to change the operating temperature of the catalyst. The temperature impact on product distribution is for example described on page 217 of "The Fischer-Tropsch and related synthesis", H. H. Storch; N. Columbic; R. B. Anderson, John Wiley & Sons, Inc., New York, 1951. There is a continuing desire in the art to improve the Fischer-Tropsch process, especially to tune the product distribution for a given catalyst during its use.

SUMMARY OF THE INVENTION

It is an object of the present invention to provide an improved Fischer-Tropsch process in which a cobalt catalyst is used that has a relatively high initial activity. Especially the way of improving the yield of the paraffins and the waxes is improved. One of the above or other objects may be achieved according to the present invention by providing a process to prepare paraffins and waxes from a gaseous feed stream comprising hydrogen and carbon monoxide in a Fischer-Tropsch reactor comprising a fixes bed of reduced Fischer-Tropsch catalyst that comprises cobalt as catalytically active metal, said process at least comprises the following steps:

(a) adding to the gaseous feed stream a nitrogen-containing compound such that the nitrogen-containing compound is present in the gaseous feed stream in a concentration of up to 10 ppmV to obtain a mixture, wherein the nitrogen-containing compound is a compound selected from ammonia, HCN, NO, amines, nitriles, and a heterocyclic compound containing at least one nitrogen atom as ring member of a heterocyclic ring;

(b) feeding the mixture of step (a) to the Fischer-Tropsch reactor to obtain a Fischer-Tropsch product comprising paraffins having from 5 to 300 carbon atoms;

(c) subjecting the Fischer-Tropsch product of step (b) to a hydrogenation step, thereby obtaining hydrogenated fraction comprising 5 to 300 carbon atoms;

(d) separating the hydrogenated Fischer-Tropsch product stream of step (c), thereby obtaining at least a fraction comprising 5 to 9 carbon atoms, a fraction comprising 10 to 17 carbon atoms and a fraction comprising 18 to 300 carbon atoms;

(e) separating the hydrogenated fraction comprising 18 to 300 carbon atoms of step (d), thereby obtaining one or more first light waxes having a congealing point in the range of 30 to 75° C. and a second heavy wax having a congealing point in the range of 75 to 120° C.

It has now been found that by adding a nitrogen containing compound to the syngas stream the hydrocarbon chain length distribution of the product stream can be influenced such that the distribution can be optimized to the paraffins and waxes comprising hydrocarbons ranging from C10 to C40.

As explained above, the Fischer-Tropsch catalyst makes a heavier product (C40+) at low temperatures. At higher operating temperatures however, the Fischer-Tropsch catalyst is more stable. Upon the addition of a nitrogen containing compound the operating temperatures can be increased such that the Fischer-Tropsch catalyst is more stable, and results therefore in less heavier product (C40+).

A further advantage is that upon addition of the nitrogen containing compound the difference between the start of the run temperature of the catalyst and end of the run temperature of the catalyst is smaller compared to operating without the addition of a nitrogen containing compound. Over lifetime the difference in product distribution for a reactor is hence reduced.

BRIEF DESCRIPTION OF THE DRAWING

The present invention will be better understood by referring to the following detailed description of preferred embodiments and the drawing referenced therein, in which:

The FIGURE is one embodiment of a process scheme according to the present invention.

DETAILED DESCRIPTION OF THE INVENTION

The process according to the invention is a process for preparing paraffins and waxes from a gaseous feed stream comprising hydrogen and carbon monoxide in a Fischer-Tropsch reactor. The gaseous feed stream comprising hydrogen and carbon monoxide is also referred to as syngas or synthesis gas. The reactor comprises a fixed bed of reduced Fischer-Tropsch catalyst present in at least one reactor tube. The catalyst comprises cobalt as catalytically active metal.

The catalyst may be a fresh catalyst or a rejuvenated catalyst. Reference herein to a fresh catalyst is to a freshly prepared catalyst that has not been subjected to a Fischer-Tropsch process. Reference herein to a rejuvenated catalyst is to a regenerated catalyst of which the initial activity has been at least partially restored, typically by means of several reduction and/or oxidation steps. The catalyst is preferably a fresh catalyst, since in particular fresh catalysts have a very high initial activity.

The catalyst comprises cobalt as catalytically active metal. Fischer-Tropsch catalysts comprising cobalt as catalytically active metal are known in the art. Any suitable cobalt-comprising Fischer-Tropsch catalysts known in the art may be used. Typically such catalyst comprises cobalt on a carrier-based support material, optionally in combination with one or more metal oxides and/or metals as promoters selected from zirconium, titanium, chromium, vanadium and manganese, especially manganese. A most suitable catalyst comprises cobalt as the catalytically active metal and titania as carrier material.

The catalyst may further comprise one or more promoters. One or more metals or metal oxides may be present as promoters, more particularly one or more d-metals or d-metal oxides. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are suitable promoters. Suitable metal promoters may be selected from Groups 7-10 of the Periodic Table of Elements. Manganese, iron, rhenium and Group 8-10 noble metals are particularly suitable as promoters, and are preferably provided in the form of a salt or hydroxide.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

A suitable catalyst comprises cobalt as the catalytically active metal and zirconium as a promoter. Another most suitable catalyst comprises cobalt as the catalytically active metal and manganese and/or vanadium as a promoter. If the catalyst comprises cobalt as the catalytically active metal and manganese and/or vanadium as promoter, the cobalt:(manganese+vanadium) atomic ratio is advantageously at least 12:1.

References to "Groups" and the Periodic Table as used herein relate to the new IUPAC version of the Periodic Table of Elements such as that described in the 87th Edition of the Handbook of Chemistry and Physics (CRC Press).

In operating the reactor according to the present invention the catalyst is a reduced catalyst. In a reduced catalyst the cobalt is essentially in its metallic state. The reactor may be provided with a fixed bed of reduced catalyst by reducing a fixed bed of catalyst precursor in-situ, i.e. in the same reactor wherein the Fischer-Tropsch hydrocarbon synthesis will take place, or by loading the reactor with a reduced catalyst that has for example be prepared by reducing a catalyst precursor in a separate vessel or reactor prior to loading the reduced catalyst in the reactor. Preferably the reactor is provided with a fixed bed of reduced catalyst by reducing a fixed bed of catalyst precursor in-situ.

Reference herein to a catalyst precursor is to a precursor that can be converted into a catalytically active catalyst by subjecting the precursor to reduction, usually by subjecting the precursor to hydrogen or a hydrogen-containing gas using reducing conditions. Such reduction step is well-known in the art.

In step (a) of the process according to the present invention to the gaseous feed stream a nitrogen-containing compound is added such that the nitrogen-containing compound is present in the gaseous feed stream in a concentration of up to 10 ppmV to obtain a mixture, wherein the nitrogen-containing compound is a compound selected from ammonia, HCN, NO, amines, nitriles, and a heterocyclic compound containing at least one nitrogen atom as ring member of a heterocyclic ring.

Preferably, the nitrogen-containing compound is added to the gaseous feed stream such that the nitrogen-containing compound is present in the gaseous feed stream in a concentration in the range of 0.05 to 10 ppmV.

Examples of suitable nitrogen-containing compounds are ammonia, HCN, NO, amines, organic cyanides (nitriles), or heterocyclic compounds containing at least one nitrogen atom as ring member of a heterocyclic ring.

Suitably, the nitrogen-containing compound is a compound selected from the group consisting of ammonia, HCN, NO, an amine and combinations or two or more thereof.

Preferred amines include amines with one or more alkyl or alcohol groups having up to five carbon atoms. More preferably, the amine is a mono-amine. Examples of especially preferred amines include trimethylamine, dipropylamine, diethanolamine, and methyl-diethanolamine. A particularly preferred nitrogen-containing compound is ammonia.

In step (b) of the process according to the present invention the mixture of step (a) is fed to the Fischer-Tropsch reactor to obtain a Fischer-Tropsch product comprising paraffins having from 5 to 300 carbon atoms.

By the part "a Fischer-Tropsch product stream comprising paraffins having from 5 to 300 carbon atoms" is meant 5 to 300 carbon atoms per molecule.

The Fischer-Tropsch product stream as provided in step (b) is derived from a Fischer-Tropsch process. Fischer-Tropsch product stream is known in the art. By the term "Fischer-Tropsch product" is meant a synthesis product of a Fischer-Tropsch process. In a Fischer-Tropsch process the synthesis gas is converted to a synthesis product. The synthesis gas or syngas is obtained by conversion of a hydrocarbonaceous feedstock. Suitable feedstock include natural gas, crude oil, heavy oil fractions, coal, biomass and lignite. A Fischer-Tropsch product derived from a hydrocarbonaceaous feedstock which is normally in the gas phase may also be referred to a GTL (Gas-to-Liquids) product. The preparation of a Fischer-Tropsch product has been described in e.g. WO2003/070857.

Known to those skilled in the art is that the temperature and pressure at which the Fischer-Tropsch process is conducted influences the degree of conversion of synthesis gas into hydrocarbons and impacts the level of branching of the paraffins (thus amount of isoparaffins). Typically, the process for preparing a Fischer-Tropsch derived wax may be carried out at a pressure above 25 bara. Preferably, the Fischer-Tropsch process is carried out at a pressure above 35 bara, more preferably above 45 bara, and most preferably above 55 bara. A practical upper limit for the Fischer-Tropsch process is 200 bara, preferably the process is carried out at a pressure below 120 bara, more preferably below 100 bara.

The Fischer-Tropsch process is suitably a low temperature process carried out at a temperature between 170 and 290° C., preferably at a temperature between 180 and 270° C., more preferably between 200 and 250° C.

The conversion of carbon monoxide and hydrogen into hydrocarbons in the process according to the present invention may be carried out at any reaction pressure and gas hourly space velocity known to be suitable for Fischer-Tropsch hydrocarbon synthesis. Preferably, the reaction pressure is in the range of from 10 to 100 bar (absolute), more preferably of from 20 to 80 bar (absolute). The gas hourly space velocity is preferably in the range of from 500 to 25,000 h−1, more preferably of from 900 to 15,000 h−1, even more preferably of from 1,300 to 8,000 h−1. Preferably, the reaction pressure and the gas hourly space velocity are kept constant.

The amount of isoparaffins is suitably less than 20 wt % based on the total amount of paraffins having from 9 to 24 carbon atoms, preferably less than 10 wt %, more preferably less than 7 wt %, and most preferably less than 4 wt %.

Suitably, the Fischer-Tropsch derived paraffin wax according to the present invention comprises more than 75 wt % of n-paraffins, preferably more than 80 wt % of n-paraffins. Further, the paraffin wax may comprise isoparaffins, cyclo-alkanes and alkyl benzene.

The Fischer-Tropsch process for preparing the Fischer-Tropsch derived wax according the present invention may be a slurry Fischer-Tropsch process, an ebullated bed process or a fixed bed Fischer-Tropsch process, especially a multitubular fixed bed.

The product stream of the Fischer-Tropsch process is usually separated into a water stream, a gaseous stream comprising unconverted synthesis gas, carbon dioxide, inert gasses and C1 to C4, and a C5+ stream.

The full Fischer-Tropsch hydrocarbonaceous product suitably comprises a C1 to C300 fraction.

Lighter fractions of the Fischer-Tropsch product, which suitably comprises C1 to C4 fraction are separated from the Fischer-Tropsch product by distillation thereby obtaining a Fischer-Tropsch product stream, which suitably comprises C5 to C300 fraction.

The above weight ratio of compounds having at least 60 or more carbon atoms and compounds having at least 30 carbon atoms in the Fischer-Tropsch product is preferably at least 0.2, more preferably 0.3.

Suitably, in case of preparation of Fischer-Tropsch derived wax fraction having a congealing point of above 90° C. the above weight ratio is at least 0.5.

The weight ratio in the Fischer-Tropsch product may lead to Fischer-Tropsch derived paraffin waxes having a low oil content.

In step (c) of the process according the present invention the Fischer-Tropsch product of step (b) is subjected to a hydrogenation step, thereby obtaining hydrogenated fraction comprising 5 to 300 carbon atoms.

The hydrogenation is suitably carried out at a temperature between 200 and 275° C. and at a pressure between 20 and 70 bar. Typically, hydrogenation removes olefins and oxygenates from the fractions being hydrogenated. Oxygenates are preferably hydrocarbons containing one or more oxygen atoms per molecule. Typically, oxygenates are alcohols, aldehydes, ketones, esters, and carboxylic acids.

In step (d) of the process according to the present invention the hydrogenated Fischer-Tropsch product stream of step (c) is separated thereby obtaining at least a fraction comprising 5 to 9 carbon atoms, a fraction comprising 10 to 17 carbon atoms and a fraction comprising 18 to 300 carbon atoms.

Preferably, the amount of the fraction comprising 5 to 9 carbon atoms of step (e) is in the range of from 3-16 wt. % based on the full Fischer-Tropsch hydrocarbonaceous product comprising a C1 to C300 fraction.

Also, the amount of the fraction comprising 10 to 17 carbon atoms of step (e) is in the range of from 3-12 wt. %. The fraction preferably is separated into a fraction comprising 10 to 13 carbon atoms and a fraction comprising 14 to 17 carbon atoms. Further, the amount of the fraction comprising 10 to 13 carbon atoms is in the range of from 3-12 wt. % and the amount of the fraction comprising 14 to 17 carbon atoms is in the range of from 3-11 wt. % based on the full Fischer-Tropsch hydrocarbonaceous product comprising a C1 to C300 fraction.

In step (e) of the process according to the present invention the hydrogenated fraction comprising 18 to 300 carbon atoms of step (e) is separated, thereby obtaining one or more first light waxes having a congealing point in the range of 30 to 75° C. and a second heavy wax having a congealing point in the range of 75 to 120° C.

By light wax is meant wax having a congealing point in the range of from 30 to 75° C. By heavy wax is meant wax having a congealing point in the range of from 75 to 120° C.

The congealing points of the paraffin waxes according to the present invention are determined according to ASTM D938.

Suitably, the hydrogenated fraction comprising 18 to 300 carbon atoms of step (d) is separated by vacuum distillation at a pressure between 5 and 20 mbar, preferably between 5 and 15 mbar, and more preferably between 10 and 15 mbar. Also the distillation is preferably carried out at a temperature of from 300 to 350° C.

Preferably, the first light one or more waxes are obtained as distillate and/or side cuts in vacuum distillation, e.g. a first light wax fraction having a congealing point in the range of from 30 to 35° C., a second light wax fraction having a congealing point in the range of from 50 to 60° C., and a third light wax fraction having a congealing point in the range of 65 to 75° C.

Suitably, the first light wax fraction is obtained as top cut of the vacuum distillation, the second light wax fraction is obtained as a side cut of the vacuum distillation and the third light wax fraction is obtained as heavier side cut of the vacuum distillation.

Preferably, one or more wax fractions having a congealing point in the range of 30 to 75° C. of step (e) are hydrofinished to obtain one or more hydrofinished wax fractions having a congealing point in the range of 30 to 75° C. Suitably, a wax fraction having a congealing point in the range 30 to 75° C. is hydrofinished thereby obtaining a hydrofinished wax fraction having a congealing point in the range of 30 to 75° C.

Optionally, the first and second light wax fractions are hydrofinished thereby obtaining a first light hydrofinished wax fraction having a congealing point in the range of from 30 to 35° C., and a second light hydrofinished wax fraction having a congealing point in the range of from 50 to 60° C.

Preferably, the amount of the hydrofinished wax fraction having a congealing point 30° C. is in the range of from 2-8 wt. % based on the full Fischer-Tropsch hydrocarbonaceous product comprising a C1 to C300 fraction. Also, the amount of hydrofinished wax fraction having a congealing point of 50° C. is preferably in the range of from 4 to 15 wt. % based on the full Fischer-Tropsch hydrocarbonaceous product comprising a C1 to C300 fraction.

Preferably at least the third light wax i.e. the heaviest side cut of the vacuum distillation step (f) is hydrofinished thereby obtaining a hydrofinished wax fraction having a congealing point in the range of 65-75° C.

Typical hydrofinishing conditions for hydrofinishing of the above fractions are described in e.g. WO2007/082589.

Suitably, the second heavy wax of step (e) is separated, thereby obtaining at least one distillate wax fraction having a congealing point in the range of from 75 to 85° C. and at least one residual wax fraction having a congealing point in the range of 95 to 120° C.

Preferably, the heavy second wax of step (e) is separated, thereby obtaining at least one distillate wax fraction having a congealing point in the range of from 70 to 90° C., preferably 70 to 85° C. and more preferably 75 to 85° C.

Suitably, the amount of hydrofinished wax fraction having a congealing point of 70° C. is in the range of 6-20 wt. % based on the full Fischer-Tropsch hydrocarbonaceous product comprising a C1 to C300 fraction.

Suitably, the heavy distillate wax fraction having a congealing point in the range of from 75 to 85° C. is hydrofinished thereby obtaining a hydrofinished heavy distillate wax fraction having a congealing point in the range of from 75 to 85° C.

Further, the heavy distillate wax fraction having a congealing point in the range of from 70 to 90° C., preferably in the range of from 70 to 85° C. and more preferably in the range of from 75 to 85° C. are hydrofinished thereby obtaining hydrofinished heavy distillate wax fraction having a congealing point in the range of from 70 to 90° C., preferably in the range of from 70 to 85° C. and more preferably in the range of from 75 to 85° C.

Preferably, the heavy residual wax fraction having a congealing point in the range of from 95 to 120° C. is hydrofinished thereby obtaining a hydrofinished heavy residual wax fraction having a congealing point in the range of from 95 to 120° C.

Typical hydrofinishing conditions for hydrofinishing of the above fractions are described in e.g. WO2007/082589.

The heavy second wax of step (e) is preferably separated by short path distillation at a pressure between preferably between 0.05 and 0.5 mbar, and more preferably between 0.1 and 0.3 mbar. The distillation is preferably carried out at a temperature of from 200 to 350° C. and more preferably from 250 to 300° C.

Typically, the residual heavy wax having a congealing point in the range of from 95 to 120° C. is obtained as the residual fraction of the short path distillation. By the term residual is meant a fraction obtained with distillation which is a residual bottom fraction and is neither a top cut nor a side cut.

Short path distillation, also known as molecular distillation is known in the art and therefore not described here in detail. An example of a form of short path distillation is a Wiped Film Evaporator. Typical short path distillations are for example described in Chapter 9.1 in "Distillation, operations and applications", Andrzej Górak and Hartmut Schoenmakers, Elsevier Inc, Oxford, 2014.

Thus, preferably the heavy residual wax fraction having a congealing point in the range of from 95 to 120° C. is hydrofinished thereby obtaining a hydrofinished heavy residual wax fraction having a congealing point in the range of from 95 to 120° C.

Preferably, one or more Fischer-Tropsch derived waxes having a congealing point in a range of from 30 to 120° C. are obtained. More preferably, a Fischer-Tropsch derived wax having a congealing point in the range of from 30 to 35° C. or in the range of from 50 to 60° C. or in the range of from 60 to 70° C., or in the range of from 75 to 85° C. or in the range of from 95 to 100° C., or in the range of from 100 to 106° C. or in the range of from 106 to 120° C. is obtained by the process according to the present invention.

Suitably, the amount of a hydrofinished wax fraction having a congealing point of 100 to 105° C. is in the range of from 10 to 75 wt. % based on the full Fischer-Tropsch hydrocarbonaceous product comprising a C1 to C300 fraction.

Determining the content of each final product fraction in the full Fischer-Tropsch hydrocarbonaceous product can be achieved by analyzing a sample of this stream with chromatographic methods such as high temperature gas chromatography or distillation. Conveniently the gas phase, liquid phase and solid phase are quantified, analyzed with the respective chromatographic methods and combined to result in the Fischer-Tropsch product distribution, taking into account that olefins and oxygenates are hydrogenated to the respective paraffin's.

Preferably, part of the first light and second heavy waxes of step (e) is subjected to a hydrocracking/hydroisomerisation step to obtain a partly isomerised product.

In a further aspect the present invention provides a Fischer-Tropsch derived paraffins and waxes obtainable by the process according to the present invention.

It has been found that the amount of the isomerised product is dependent on the hydrocracking/hydroisomerization conditions. Hydrocracking/hydroisomerization processes are known in the art and therefore not discussed here in detail.

Hydrocracking/hydroisomerization and the effect of hydrocracking/hydroisomerization conditions on the amount of isomerised product are for example discussed in Chapter 6 of "Hydrocracking Science and Technology", Julius Scherzer; A. J. Cruia, Marcel Dekker, Inc. New York, 1996, ISBN 0-8247-9760-4.

The FIGURE schematically shows a process schemes of the process scheme of a preferred embodiment of the process according to the present invention.

For the purpose of this description, a single reference number will be assigned to a line as well as a stream carried in that line.

The process scheme is generally referred to with reference numeral 1.

Fischer-Tropsch derived paraffin fractions (Fraction 1 (C5-C9), Fraction 2 (C10-C13), Fraction 3 (C14-C17)) and Fischer-Tropsch derived paraffin wax fractions (Paraffin wax 1, Paraffin wax 2, Paraffin wax 3, Paraffin wax 4 and Paraffin wax 5) were obtained using a Fischer-Tropsch process. In general a Fischer-Tropsch effluent was prepared as follows. A cobalt-based Fischer-Tropsch catalyst was loaded in a reactor tube 2 and reduced. The initial reaction was set such that the resulting space time yield (STY) was 200 grams hydrocarbon products per liter catalyst per hour. The pressure of the syngas was 60 bar. Ammonia was fed to the syngas stream fed into the reactor 2 at an amount of 4.4 ppmv. The reaction temperature was kept at 220° C. and the STY was 201 g/l·h.

The effluent was separated in a fraction A which is in the gas phase at ambient conditions and a fraction B which is in the liquid or solid phase at ambient conditions.

For all distillations described below care was taken to avoid temperatures above 370° C. for any part of the distillation equipment in contact with hydrocarbons and to avoid contact of hydrocarbons with oxygen. All distillations described below were carried out in a continuous mode.

Fraction B was hydrogenated over a nickel catalyst as described in WO 2007/082589 (Catalyst G) in a hydrogenation reactor 3. Process conditions were: a weight hourly space velocity (WHSV) of 1.0 kg/l/h, 30 bar of pure hydrogen at reactor inlet, a hydrogen over feedstock ratio of 1000 Nl/kg and a temperature of 220° C.

The hydrogenated product C was subjected to a distillation column 4 at atmospheric pressure yielding a top stream D comprising a fraction containing molecules with 9 or less carbon atoms (Fraction 1 (C5-C9)), a side cut E containing molecules with 10 to 17 carbons atoms and a bottom stream F containing molecules with 18 to 300 carbon atoms. The effective cutpoint for the separation between streams E and F was 310° C.

Fraction E was separated in a distillation column 5 in a fraction G (Fraction 2 (C10-C13)) and a fraction H (Fraction 3 (C14-C17)).

Fraction F consists of hydrogenated normal paraffins in the C18 to C300 range.

Fraction F is subjected to a vacuum distillation column 6. Besides a top product (stream I), a side cut (stream J) and a heavier side cut (stream K) were obtained as well as a bottom product (stream L). The distillation was run at a bottom temperature of 320° C. and a pressure of 15 mbar. The effective cutpoint between stream I and stream J was 340° C. The effective cutpoint between stream J and stream K was 445° C. The effective cutpoint between stream K and bottom stream L was 495° C. Stream I is obtained as a refined wax with a congealing point of about 30° C. (Paraffin wax 1). Stream J is obtained as a refined wax with a congealing point of about 50° C. (Paraffin wax 2). Stream K is obtained as a wax with a congealing point of about 70° C. Stream L is subjected to a hydrofinishing operation in a hydrofinishing reactor 7 over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C. The product was separated in a fraction M which is in the gas phase at ambient conditions and a fraction N which is in the solid phase at ambient conditions.

Fraction N is obtained as a refined wax with a congealing point of about 70° C. (Paraffin wax 3).

The residue of this vacuum distillation (fraction L) is subjected to a short path distillation column 8 with an effective cut point of 525° C. The distillation was run at 0.2 mbar and 260° C. The distillate of the short path distillation (fraction O) is subjected to a hydrofinishing operation in a hydrofinishing reactor 9 over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C. The product was separated in a fraction S which is in the gas phase at ambient conditions and a fraction T which is in the solid phase at ambient conditions. Fraction T is obtained as a refined wax with a congealing point of about 80° C. (Paraffin wax 4).

The residue of the short path distillation (fraction P) is subjected to a hydrofinishing operation in a hydrofinishing reactor 10 over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C.

The product was separated in a fraction U which is in the gas phase at ambient conditions and a fraction V which is in the solid phase at ambient conditions.

Fraction V is obtained as a refined wax with a congealing point of about 100-110° C. (Paraffin wax 5). The invention is illustrated by the following non-limiting examples.

EXAMPLES

In general the following experiments were conducted as follows.

A cobalt-based Fischer-Tropsch catalyst was loaded in a reactor tube and reduced. The initial reaction was set such that the resulting space time yield (STY) was 200 grams hydrocarbon products per liter catalyst per hour. The reaction temperature thus set was 220° C. The STY was maintained at a value of 200 g/l·h. and the pressure of the syngas was 60 bar.

Experiment 1 (Invention)

Experiment 1 was conducted as described above with the exception that ammonia was added to the syngas stream fed into the reactor at an amount of 4.4 ppm. The reaction temperature was kept at 220° C. and the STY was 201 g/l·h.

Experiment 2 (Comparative Example)

In Experiment 2 no ammonia was added to the syngas stream provided to the reactor. The reaction temperature was kept at 210° C. and the STY was 206 g/l·h.

The results obtained in experiment 1 and 2 are listed in table 1. The content is expressed in weight percent based on the total content of the product stream exiting the reactor. The fractions are classified and identified by their hydrocarbon chain lengths per fraction.

TABLE 1

| Fraction | Content (wt %) | |
|---|---|---|
| | Experiment 1 | Experiment 2 |
| C1-C4 | 8.3 | 7.9 |
| Fraction 1 (C5-C9) | 13 | 8.5 |
| Fraction 2 (C10-C13) | 10 | 7.1 |
| Fraction 3 (C14-C17) | 8.7 | 6.5 |
| Paraffin wax 1 (SX30-C18-C20) | 5.6 | 4.2 |
| Paraffin wax 2 (SX50 (C21-C40) | 11 | 8.3 |
| Paraffin wax 3 (SX70-C28-C40) | 15 | 12 |
| Paraffin wax 4 (SX100 (OR 105)-C41+) | 28 | 45 |

Discussion

The results in Table 1 show a clear increase in the concentration of the fractions 1 to 3 and paraffin wax fractions 1 to 4 from 46.6 wt. % to 63.3 wt. %. Hence a clear increase in selectivity towards C5 to C40 hydrocarbons is observed. These observations indicate that upon addition of ammonia to the syngas stream results in a decrease in C41+ selectivity of the Fischer-Tropsch catalyst.

While the invention has been described in terms of what are presently considered to be the most practical and preferred embodiments, it is to be understood that the disclosure need not be limited to the disclosed embodiments. It is intended to cover various modifications, combinations and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Any patents, publications, or other references mentioned in this application for patent are hereby incorporated by reference. In addition, as to each term used, it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans.

That which is claimed is:

1. A process for the preparation of paraffins and waxes from a gaseous feed stream comprising hydrogen and carbon monoxide in a Fischer-Tropsch reactor comprising a fixed bed of reduced Fischer-Tropsch catalyst that comprises cobalt as catalytically active metal, said process at least comprises the following steps:
    (a) adding to the gaseous feed stream a nitrogen-containing compound such that the nitrogen-containing compound is present in the gaseous feed stream in a concentration of up to 10 ppmV to obtain a mixture, wherein the nitrogen-containing compound is a compound selected from the group consisting of ammonia, HCN, NO, amines, nitriles, and a heterocyclic compound containing at least one nitrogen atom as ring member of a heterocyclic ring;
    (b) feeding the mixture of step (a) to the Fischer-Tropsch reactor to obtain a Fischer-Tropsch product comprising paraffins having from 5 to 300 carbon atoms;
    (c) subjecting the Fischer-Tropsch product of step (b) to a hydrogenation step, thereby obtaining hydrogenated fraction comprising 5 to 300 carbon atoms;
    (d) separating the hydrogenated Fischer-Tropsch product stream of step (c), thereby obtaining at least a fraction comprising 5 to 9 carbon atoms, a fraction comprising 10 to 17 carbon atoms and a fraction comprising 18 to 300 carbon atoms, wherein the fraction comprising 10 to 17 carbon atoms is separated into a fraction comprising 10 to 13 carbon atoms and a fraction comprising 14 to 17 carbon atoms;
    (e) separating the hydrogenated fraction comprising 18 to 300 carbon atoms of step (d), thereby obtaining one or more first light waxes having a congealing point in the range of 30 to 75° C. and a second heavy wax having a congealing point in the range of 75 to 120° C.

2. The process according to claim 1, wherein a nitrogen-containing compound other than molecular nitrogen is added to the gaseous feed stream in step (a) such that the nitrogen-containing compound is present in the gaseous feed stream in a concentration in the range of 0.05 to 10 ppmV.

3. The process according to claim 1, wherein the nitrogen-containing compound is a compound selected from the group consisting of ammonia, HCN, NO, an amine and combinations of two or more thereof.

4. The process according to claim 3, wherein the nitrogen-containing compound is ammonia.

5. The process according to claim 1, wherein the amount of the fraction comprising 5 to 9 carbon atoms of step (e) is in the range of from 3-16 wt. % based on the full Fischer-Tropsch hydrocarbonaceous product comprising a C1 to C300 fraction.

6. The process according to claim 1, wherein the amount of the fraction comprising 10 to 13 carbon atoms is in the range of from 3-12 wt. % and the amount of the fraction comprising 14 to 17 carbon atoms is in the range of from 3-11 wt. % based on the full Fischer-Tropsch hydrocarbonaceous product comprising a C1 to C300 fraction.

7. The process according to claim 1, wherein one or more wax fractions having a congealing point in the range of 30 to 75° C. of step (e) are hydrofinished to obtain one or more hydrofinished wax fractions having a congealing point in the range of 30 to 75° C.

8. The process according to claim 7, wherein the amount of hydrofinished wax fraction having a congealing point of 30° C. is in the range of from 2-8 wt % based on the full Fischer-Tropsch hydrocarbonaceous product comprising a C1 to C300 fraction.

9. The process according to claim 7, wherein the amount of hydrofinished wax fraction having a congealing point of 50° C. is in the range of from 4-15 wt % based on the full Fischer-Tropsch hydrocarbonaceous product comprising a C1 to C300 fraction.

10. The process according to claim 7, wherein the amount of hydrofinished wax fraction having a congealing point of 70° C. is in the range of from 6-20 wt % based on the full Fischer-Tropsch hydrocarbonaceous product comprising a C1 to C300 fraction.

11. A process for the preparation of process to prepare paraffins and waxes from a gaseous feed stream comprising hydrogen and carbon monoxide in a Fischer-Tropsch reactor comprising a fixed bed of reduced Fischer-Tropsch catalyst that comprises cobalt as catalytically active metal, said process at least comprises the following steps:
(a) adding to the gaseous feed stream a nitrogen-containing compound such that the nitrogen-containing compound is present in the gaseous feed stream in a concentration of up to 10 ppmV to obtain a mixture, wherein the nitrogen-containing compound is a compound selected from the group consisting of ammonia, HCN, NO, amines, nitriles, and a heterocyclic compound containing at least one nitrogen atom as ring member of a heterocyclic ring;
(b) feeding the mixture of step (a) to the Fischer-Tropsch reactor to obtain a Fischer-Tropsch product comprising paraffins having from 5 to 300 carbon atoms;
(c) subjecting the Fischer-Tropsch product of step (b) to a hydrogenation step, thereby obtaining hydrogenated fraction comprising 5 to 300 carbon atoms;
(d) separating the hydrogenated Fischer-Tropsch product stream of step (c), thereby obtaining at least a fraction comprising 5 to 9 carbon atoms, a fraction comprising 10 to 17 carbon atoms and a fraction comprising 18 to 300 carbon atoms;
(e) separating the hydrogenated fraction comprising 18 to 300 carbon atoms of step (d), thereby obtaining one or more first light waxes having a congealing point in the range of 30 to 75° C. and a second heavy wax having a congealing point in the range of 75 to 120° C., wherein the second heavy wax of step (e) is separated, thereby obtaining at least one distillate wax fraction having a congealing point in the range of between 75 to 85° C. and at least one residual wax fraction having a congealing point in the range of from 95 to 120° C.

12. The process according to claim 11, the heavy distillate wax fraction having a congealing point in the range of between 75 to 85° C. is hydrofinished to obtain a hydrofinished heavy distillate wax fraction having a congealing point in the range of between 75 and 85° C.

13. The process according to claim 11, wherein the heavy residual wax fraction having a congealing point in the range of 95 to 120° C. is hydrofinished to obtain a hydrofinished heavy residual wax fraction having a congealing point in the range of 95 to 120° C.

14. The process according to claim 11, wherein a nitrogen-containing compound other than molecular nitrogen is added to the gaseous feed stream in step (a) such that the nitrogen-containing compound is present in the gaseous feed stream in a concentration in the range of 0.05 to 10 ppmV.

15. The process according to claim 11, wherein the nitrogen-containing compound is a compound selected from the group consisting of ammonia, HCN, NO, an amine and combinations of two or more thereof.

16. The process according to claim 11, wherein the amount of the fraction comprising 5 to 9 carbon atoms of step (e) is in the range of from 3-16 wt. % based on the full Fischer-Tropsch hydrocarbonaceous product comprising a C1 to C300 fraction.

17. The process according to claim 11, wherein the fraction comprising 10 to 17 carbon atoms is separated into a fraction comprising 10 to 13 carbon atoms and a fraction comprising 14 to 17 carbon atoms.

18. The process according to claim 17, wherein the amount of the fraction comprising 10 to 13 carbon atoms is in the range of from 3-12 wt. % and the amount of the fraction comprising 14 to 17 carbon atoms is in the range of from 3-11 wt. % based on the full Fischer-Tropsch hydrocarbonaceous product comprising a C1 to C300 fraction.

19. The process according to claim 11, wherein one or more wax fractions having a congealing point in the range of 30 to 75° C. of step (e) are hydrofinished to obtain one or more hydrofinished wax fractions having a congealing point in the range of 30 to 75° C.

20. The process according to claim 19, wherein the amount of hydrofinished wax fraction having a congealing point of 30° C. is in the range of from 2-8 wt % based on the full Fischer-Tropsch hydrocarbonaceous product comprising a C1 to C300 fraction.

* * * * *